United States Patent
Chiong et al.

(10) Patent No.: US 9,388,283 B2
(45) Date of Patent: Jul. 12, 2016

(54) METHOD OF POLYARYLENE SULFIDE CRYSTALLIZATION

(71) Applicant: Ticona LLC, Florence, KY (US)

(72) Inventors: Hendrich Chiong, Florence, KY (US); Michael Haubs, Florence, KY (US); Damian Feord, Florence, KY (US); Stanley Leonard, Florence, KY (US); Jacob Grayson, Florence, KY (US); Venkata Nekkanti, Florence, KY (US)

(73) Assignee: Ticona LLC, Florence, KY (US)

( * ) Notice: Subject to any disclaimer, the term of this patent is extended or adjusted under 35 U.S.C. 154(b) by 1 day.

(21) Appl. No.: 14/481,285

(22) Filed: Sep. 9, 2014

(65) Prior Publication Data

US 2015/0087780 A1 Mar. 26, 2015

Related U.S. Application Data

(60) Provisional application No. 61/882,344, filed on Sep. 25, 2013.

(51) Int. Cl.
  *C08G 75/16* (2006.01)
  *C08J 3/20* (2006.01)

(52) U.S. Cl.
  CPC ............... *C08G 75/16* (2013.01); *C08J 3/203* (2013.01); *C08J 2381/04* (2013.01)

(58) Field of Classification Search
  USPC .................................. 528/388, 373; 524/609
  See application file for complete search history.

(56) References Cited

U.S. PATENT DOCUMENTS

| | | |
|---|---|---|
| 3,869,433 A | 3/1975 | Campbell |
| 4,038,259 A | 7/1977 | Campbell et al. |
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | CampbelL |
| 4,056,515 A | 11/1977 | Vidaurri, Jr. |
| 4,060,520 A | 11/1977 | Irvin |
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,370,470 A | 1/1983 | Vidaurri et al. |
| 4,393,197 A | 7/1983 | Edmonds, Jr. |

(Continued)

FOREIGN PATENT DOCUMENTS

| | | |
|---|---|---|
| EP | 2 322 485 A1 | 5/2011 |
| JP | H07228699 | 8/1995 |

(Continued)

OTHER PUBLICATIONS

International Patent Application No. PCT/US2014/54734; International Search Report and Written Opinion dated Nov. 25, 2014; (7 pages).

(Continued)

*Primary Examiner* — Duc Truong
(74) *Attorney, Agent, or Firm* — Dority & Manning, P.A.

(57) ABSTRACT

A method for formation of a semi-crystalline polyarylene sulfide is described. The method can include reaction of sulfur-containing monomer with a dihaloaromatic monomer in an organic amide solvent to form a polymer following by combination of the polymer with a crystallization solution. The crystallization solution is pre-heated and the mixture formed is slowly cooled to crystallize the polymer.

27 Claims, 2 Drawing Sheets

(56) References Cited

U.S. PATENT DOCUMENTS

| | | |
|---|---|---|
| 4,451,640 A | 5/1984 | Shiiki et al. |
| 4,457,812 A | 7/1984 | Rado |
| 4,495,332 A | 1/1985 | Shiiki et al. |
| 4,501,902 A | 2/1985 | Cleary |
| 4,514,558 A | 4/1985 | Shiiki et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,745,167 A | 5/1988 | Iizuka et al. |
| 4,761,468 A | 8/1988 | Okamoto et al. |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,841,019 A | 6/1989 | Iwasaki et al. |
| 4,931,516 A | 6/1990 | Iizuka et al. |
| 4,976,825 A | 12/1990 | Iwasaki et al. |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,086,163 A | 2/1992 | Scoggins et al. |
| 5,110,902 A | 5/1992 | Scoggins et al. |
| 5,126,430 A | 6/1992 | Senga et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,635,587 A | 6/1997 | Koyama et al. |
| 5,688,908 A | 11/1997 | Haubs et al. |
| 5,744,576 A | 4/1998 | Miyahara et al. |
| 5,756,654 A | 5/1998 | Sase et al. |
| 5,777,069 A | 7/1998 | Tsuda et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,898,061 A | 4/1999 | Sase et al. |
| 5,929,203 A | 7/1999 | Ash et al. |
| 6,001,934 A | 12/1999 | Yamanaka et al. |
| 6,201,097 B1 | 3/2001 | Geibel et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,562,900 B2 | 5/2003 | Okamoto et al. |
| 6,600,009 B2 | 7/2003 | Inoue et al. |
| 6,646,105 B2 | 11/2003 | Shirota |
| 6,653,437 B2 | 11/2003 | Hinokimori et al. |
| 6,743,890 B2 | 6/2004 | Bando |
| 6,750,319 B2 | 6/2004 | Koyama |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,426,552 B2 | 4/2013 | Hinokimori et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,680,230 B2 | 3/2014 | Konno et al. |
| 2003/0150804 A1 | 8/2003 | Haubs et al. |
| 2004/0249118 A1 | 12/2004 | Kagoshima et al. |
| 2005/0171332 A1 | 8/2005 | Koyama |
| 2006/0084785 A1 | 4/2006 | Sato et al. |
| 2010/0137531 A1 | 6/2010 | Horiuchi |
| 2010/0163499 A1 | 7/2010 | Odueyungbo |
| 2010/0210813 A1 | 8/2010 | Foder et al. |
| 2010/0228003 A1 | 9/2010 | Hinokimori et al. |
| 2010/0234559 A1 | 9/2010 | Sato et al. |
| 2011/0124825 A1 | 5/2011 | Konno et al. |
| 2011/0178268 A1 | 7/2011 | Suzuki et al. |
| 2011/0319587 A1 | 12/2011 | Hinokimori |
| 2012/0165501 A1 | 6/2012 | Kaiho et al. |
| 2012/0322972 A1 | 12/2012 | Koizumi et al. |
| 2012/0329984 A1 | 12/2012 | Kim et al. |
| 2013/0022808 A1 | 1/2013 | Taniguchi et al. |
| 2013/0065054 A1 | 3/2013 | Ichinose et al. |
| 2013/0068256 A1 | 3/2013 | Kobayashi et al. |
| 2013/0116401 A1 | 5/2013 | Kimura et al. |
| 2013/0253147 A1 | 9/2013 | Ichinose et al. |
| 2014/0128568 A1 | 5/2014 | Hinokimori |
| 2015/0065664 A1 | 3/2015 | Konno et al. |

FOREIGN PATENT DOCUMENTS

| | | |
|---|---|---|
| JP | H07242746 | 9/1995 |
| JP | H07292107 | 11/1995 |
| JP | H07316428 | 12/1995 |
| JP | H07330911 | 12/1995 |
| JP | H0820644 | 1/1996 |
| JP | H0820645 | 1/1996 |
| JP | H08100064 | 4/1996 |
| JP | H08118502 | 5/1996 |
| JP | H08118503 | 5/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |
| JP | H08283413 | 10/1996 |
| JP | H08319348 | 12/1996 |
| JP | H0967439 | 3/1997 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |

(56) References Cited

FOREIGN PATENT DOCUMENTS

| | | |
|---|---|---|
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| WO | WO 2013/061561 A1 | 5/2013 |
| WO | WO 2013/147141 | 10/2013 |

OTHER PUBLICATIONS

International Patent Application No. PCT/US2014/54741; International Search Report and Written Opinion dated Nov. 25, 2014; (7 pages).

International Patent Application No. PCT/US2014/54724; International Search Report and Written Opinion dated Dec. 8, 2015; (6 pages).

International Patent Application No. PCT/US2014/54728; International Search Report and Written Opinion dated Jan. 16, 2015; (11 pages).

International Patent Application No. PCT/US2014/54745; International Search Report and Written Opinion dated Nov. 25, 2014; (7 pages).

International Patent Application No. PCT/US2014/54750; International Search Report and Written Opinion dated Jan. 22, 2014; (11 pages).

METHOD OF POLYARYLENE SULFIDE CRYSTALLIZATION

CROSS REFERENCE TO RELATED APPLICATIONS

The present application claims filing benefit of U.S. Provisional Patent application 61/882,344 having a filing date of Sep. 25, 2013, which is incorporated herein by reference in its entirety.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent.

Following formation, polyarylene sulfides can be subjected to a crystallization process that can affect optical, mechanical, thermal, and/or chemical properties of the polymer. While crystallization methods can be carried out according to several different processes (e.g., stretching), it is common for polyarylene sulfides to be crystallized upon cooling from the melt, for instance following final polymerization during a formation process. Unfortunately, even minor variations in the crystallization process can lead to large differences in the degree of crystallization of the polymer and as such large variation in the polymer characteristics. Accordingly, crystallization processes must be tightly controlled so as to avoid such variations.

Methods have been developed to improve control of the cooling crystallization of the formed polymers, and thus improve the desired qualities of the semi-crystalline polyarylene sulfide product. For instance, the use of temperature controlled jacketing around a reactor to maintain a temperature differential between the jacketing and the polymer through a slow cooling process has proven useful.

While such cooling crystallization processes have been developed and improved upon to better control the crystallization of polyarylene sulfides, room for further improvement exists. What is needed in the art is a method and system for crystallization of polyarylene sulfides that can provide reliable and consistent crystallization. Such improvements can be utilized to provide polyarylene sulfides with more consistent characteristics.

SUMMARY

A method is disclosed for forming a semi-crystalline polyarylene sulfide. For instance, a method can include polymerizing a sulfur-containing monomer and a dihaloaromatic monomer in an organic amide solvent to form a polyarylene sulfide prepolymer. The method can also include polymerizing the polyarylene sulfide prepolymer with a second sulfur-containing monomer and a second dihaloaromatic monomer to increase the molecular weight of the prepolymer and form the polyarylene sulfide polymer. The method also includes combining the polyarylene sulfide polymer with a crystallization solution to form a polymer mixture such that the mixture includes the crystallization solution in an amount of about 5 wt. % or greater by weight of the mixture. In addition, the crystallization solution is pre-heated prior to combination with the composition in order that the polymer mixture is at a temperature of about 230° C. or greater following combination with the crystallization solution. The mixture is then cooled slowly, for instance at a rate of about 0.5° C. per minute or less until it reaches a temperature of about 190° C. or less. During the cooling period the polyarylene sulfide crystallizes to form the semi-crystalline polyarylene sulfide.

BRIEF DESCRIPTION OF THE FIGURES

The present disclosure may be better understood with reference to the following figures.

DETAILED DESCRIPTION

It is to be understood by one of ordinary skill in the art that the present discussion is a description of exemplary embodiments only, and is not intended as limiting the broader aspects of the present invention.

The present disclosure is generally directed to methods of forming a semi-crystalline polyarylene sulfide. More specifically, the disclosed methods include forming a polyarylene sulfide and then diluting the polyarylene sulfide with a pre-heated crystallization solution to form a polymer mixture. The polymer mixture can then be slowly cooled to crystallize the polymer. By pre-heating the crystallization solution, the polymer crystallization can be more reliable and the product polymer can exhibit more consistency with regard to a plurality of physical characteristics.

The crystallization solution can be designed with particular components to provide further benefit to the method and product. For instance, in one embodiment the crystallization solution can be acidic and can neutralize components of the polymer mixture that can have detrimental effects on the crystallization process. The crystallization solution can include additional or alternative components in predetermined proportions depending upon the nature of the polymer and/or other components in the polymer mixture and the desired characteristics of the product. For instance, the crystallization solution can be acidic or basic, can be aqueous or organic, or can include both water and organic components.

Figure 1:
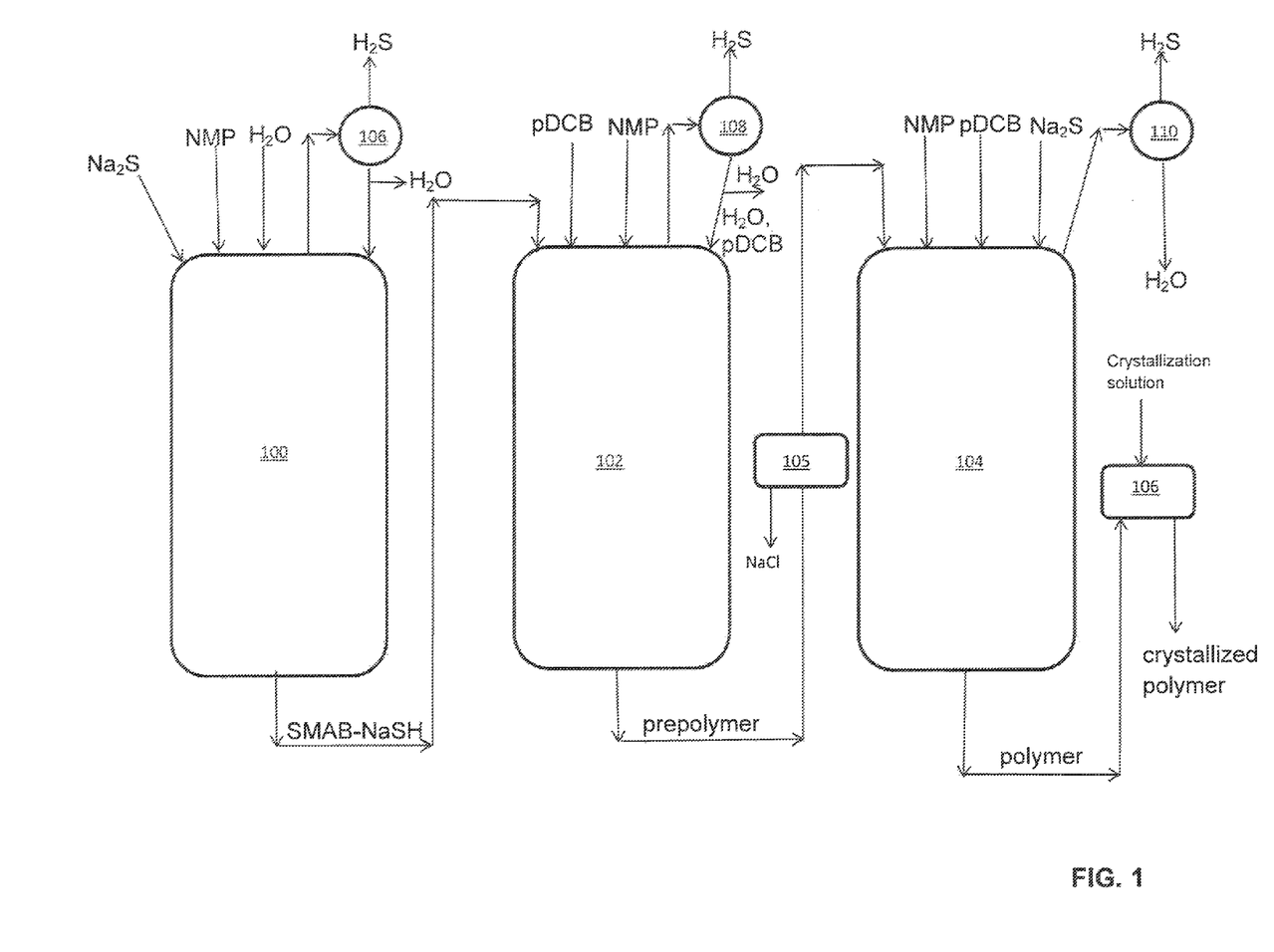
FIG. 1 is a flow diagram for one embodiment of a polyarylene sulfide formation process as described herein.

FIG. 1 illustrates one embodiment of a formation process that includes a crystallizer 106. As shown, a crystallization solution can be fed to the crystallizer 106 in conjunction with a polymer that can be been transferred from a reactor 104 to the crystallizer 106. The polymer can be a component of a polymer composition that can include the polyarylene sulfide and a solvent in addition to other formation components such as unreacted monomers, oligomers, catalysts, by-products (e.g., salt), etc. In one embodiment, the polymer composition can be a near-anhydrous composition and can include little or no water. For instance, the polymer composition exiting the reactor 104 can be less than about 2 wt. % or less than about 1 wt. % water, for example between 0 and about 2 wt. % water.

In one embodiment, the crystallization solution can include water, and the amount of the crystallization solution that is added to the polymer can be such that the polymer mixture thus formed is from about 3 wt. % to about 10 wt. %, from about 4 wt. % to about 7 wt. %, or about 5 wt. % water by weight of the mixture.

The crystallization solution can include an organic solvent. For instance, the crystallization solution can include an organic amide solvent that is used in formation of the polymer. Exemplary organic amide solvents as may be used in a forming the polyarylene sulfide can include, without limita- tion, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent that can be added to the crystallizer can be such to obtain a ratio of mole of solvent to monomer unit of the polymer of from about 3 to about 5, or about 4. For example, the mixture formed that includes the polymer composition and the crystallization solution can be from about 60 wt. % to about 90 wt. %, or from about 70 wt. % to about 80 wt. % organic amide solvent.

According to one embodiment, the crystallization solution can include an acid, such as acetic acid. In the course of formation of the polymer, discussed further herein, the organic amide solvent can be hydrolyzed to form an organic amine, which is believed to function as a surfactant in the polymer composition and interfere with the crystallization process. The acid in the crystallization solution can neutralize the organic amine and convert it back to the organic amide, and thus improve crystallization of the polymer by, e.g., forming a product polymer with a higher crystallization temperature $T_{c2}$ than would otherwise be formed.

The molar amount of acid that can be included in the crystallization solution can be equivalent to the molar amount of hydrogen sulfide formed during formation of the polymer. The amount of hydrogen sulfide by-product formed during the polymer formation can vary, as is known, but in general can be less than about 20 mol % of the total amount of sulfur added to the process, for example from about 1 mol % to about 15 mol %, from about 2 mol % to about 10 mol %, or from about 3 mol % to about 4 mol % of the total sulfur added to the process.

Prior to combination with the polymer, the crystallization solution can be pre-heated such that the mixture formed by combination of the crystallization solution and the polymer composition has an initial temperature of about 230° C. or greater. For instance, the crystallization solution can be pre-heated to a temperature of from about 50° C. to about 200° C., or from about 80° C. to about 150° C. prior to combination with the polymer composition.

In general, the polyarylene sulfide that is fed to the crystallizer can be a polyarylene thioether containing repeat units of the formula (I):

$$—[(Ar^1)_n—X]_m—[(Ar^2)_i—Y]_j—[(Ar^3)_k—Z]_l— \\ [(Ar^4)_o—W]_p—$$ (I)

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (-AR-S—) units. In one embodiment the polyarylene sulfide includes at least 85 mol % sulfide linkages attached directly to two aromatic rings. In one embodiment, the polyarylene sulfide formed by the process can be a polyphenylene sulfide, defined herein as containing the phenylene sulfide structure —$(C_6H_4—S)_n$— (wherein n is an integer of 1 or more) as a component thereof.

The polymer mixture that includes the polymer and the crystallization solution can be slowly cooled at crystallizer 106 to form the semi-crystalline polyarylene sulfide. For instance, the polymer mixture can be cooled at a rate of less than about 1° C. per minute, for instance from about 0.2° C./min. to about 0.8° C./min., from about 0.3° C./min. to about 0.7° C./min., or from about 0.4° C. to about 0.6° C./min. In one embodiment, the polymer mixture can be cooled at a rate of about 0.5° C./min.

The polymer mixture can generally be cooled to a temperature of about 190° C. or less and the polyarylene sulfide can crystallize during the cooling process. For instance, the polymer mixture can be cooled to a temperature of between about 170° C. and about 190° C. and the polyarylene sulfide can crystallize to form the semi-crystalline polymer.

While the process utilized to form the polyarylene sulfide is not limited, in one embodiment, the polyarylene sulfide can be formed in a multi-stage process as is illustrated in FIG. 1. For example, the multi-stage process can include at least three separate formation stages that can take place in three different reactors 100, 102, 104. The first stage of the formation process can include reaction of an alkali metal sulfide with an organic amide solvent to form a complex including a hydrolysis product of the solvent and alkali metal hydrogen sulfide. The second stage of the formation process can include reaction of the complex formed in the first stage with a dihaloaromatic monomer to form a prepolymer, and the third stage can include further polymerization of the prepolymer to form the final product.

In another embodiment, the three stages of the formation process can be carried out in a single reactor or in two reactors. For instance, the first and second stages of the process can be carried out in a single reactor, following which the prepolymer is transferred to a second reactor for further polymerization. Alternatively, the complex can be first formed in a first reactor, and then the prepolymer and polymer can be formed sequentially in a second reactor.

Referring again to the three reactor system of FIG. 1, the first reactor 100 can be utilized for a first stage of the process during which an organic amide solvent and an alkali metal sulfide can react to form a complex that includes a hydrolysis product of the organic amide solvent and an alkali metal hydrosulfide.

Exemplary organic amide solvents as may be used in a forming the polyarylene sulfide can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

The alkali metal sulfide can be, for example, lithium sulfide, sodium sulfide, potassium sulfide, rubidium sulfide, cesium sulfide or a mixture thereof. An alkali metal sulfide can also be generated in situ. For instance, a sodium sulfide hydrate can be prepared within the first reactor 100 from sodium hydrogen sulfide and sodium hydroxide that can be fed to the reactor. When a combination of alkali metal hydrogen sulfide and alkali metal hydroxide are fed to the reactor 100 to form the alkali metal sulfide, the molar ratio of alkali metal hydroxide to alkali metal hydrogen sulfide can be between about 1.005 and about 1.020. In addition, a small amount of an alkali metal hydroxide can be included in the first reactor 100 to remove or react impurities (e.g., to change such impurities to harmless materials) such as an alkali metal polysulfide or an alkali metal thiosulfate, which may be present in a very small amount with the alkali metal sulfide.

In the embodiment illustrated in FIG. 1, the feed to the first reactor 100 can include sodium sulfide ($Na_2S$) (which can be in the hydrate form), N-methyl-2-pyrrolidone (NMP) and water. Reaction between the water, sodium sulfide and the NMP can form a complex including sodium methylaminobutyrate (SMAB—a hydrolysis product of NMP) and sodium hydrogen sulfide (NaSH) (SMAB-NaSH) according to the following reaction scheme:

According to one embodiment, a stoichiometric excess of the alkali metal sulfide can be utilized in the first stage reactor, though this is not a requirement of the formation stage. For instance, the molar ratio of sulfur to organic amide solvent in the feed can be from about 0.2 to about 5, from about 0.5 to about 2, from about 0.6 to about 1 or from about 0.7 to about 0.8.

During the formation of the complex, the pressure within the first reactor 100 can be held at or near atmospheric pressure. To maintain the low pressure reaction conditions, vapor can be removed from the reactor. The main constituents of the vapor can include water and hydrogen sulfide by-product. As illustrated in FIG. 1, hydrogen sulfide of the vapor can be separated for instance at a condenser 106. In one embodiment, the reactor feed can include a stoichiometric excess of the alkali metal sulfide. In this embodiment, the product solution including the SMAB-NaSH complex will be a highly alkaline solution. This can be of benefit in one embodiment as the highly alkaline SMAB-NaSH solution can act as an absorber for the hydrogen sulfide in the first reactor 100 and can lower loss of hydrogen sulfide in the vapor stream from the reactor 100.

A portion of the water that is separated at condenser 106 can be returned to the reactor 100 to maintain the reaction conditions. Another portion of the water can be removed from the process so as to dehydrate the SMAB-NaSH solution formed in the first stage. For instance, the molar ratio of water to NaSH in the product solution of the first reactor 100 can less than about 1.5, or can be between about 0.1 and about 1 such that the SMAB-NaSH complex solution that is fed to the second stage reactor 102 is near-anhydrous.

The reactor utilized in the first stage can be stainless steel, though improved corrosion can be obtained by use of other materials such as a nickel-based alloy or titanium. The materials in the first reactor 100 can be heated to a temperature of, for example, between about 140° and about 220° C., for instance from about 150° C. to about 210° C., or from about 165° C. to about 200° C. during the complex formation reaction. The complex formation reaction is an exothermic reaction, and suitable temperature control mechanisms can be utilized to maintain desired reaction conditions, as needed. The reaction can be carried out in a batch-wise or continuously.

The SMAB-NaSH complex can be fed to the second reactor 102 in conjunction with a dihaloaromatic monomer and a suitable solvent so as to form the polyarylene sulfide prepolymer in the second stage of the process. A dihaloaromatic monomer can be, without limitation, a dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic monomers may be used either singly or in any combination thereof. Specific exemplary dihaloaromatic monomers can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom of the dihaloaromatic monomer can be fluorine, chlorine, bromine or iodine, and two halogen atoms in the same dihaloaromatic monomer may be the same or different from each other. In one embodiment, o-dichlorobenzene, m-dichlorobenzene, p-dichlorobenzene or a mixture of 2 or more monomers thereof is used as the dihalo-aromatic monomer.

The polyarylene sulfide may be a homopolymer or may be a copolymer. By a suitable, selective combination of dihaloaromatic monomers, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

and segments having the structure of formula (III):

or segments having the structure of formula (IV):

In another embodiment, a copolymer can be formed and a monomer can be charged to the system having the formula (V):

(V)

where the radicals $R^1$ and $R^2$, independently of one another, are a hydrogen, fluorine, chlorine or bromine atom or a branched or unbranched alkyl or alkoxy radical having from 1 to 6 carbon atoms. In one embodiment, a monomer of formula (V) can be p-hydroxybenzoic acid or one of its derivatives

Another monomer as may be charged to the system can have a structure of the formula (VI):

(VI)

One example of a monomer of formula (VI) is 2-hydroxynaphthalene-6-carboxylic acid. Monomers of the formula V and VI may be both charged to the system to form a polyarylene sulfide copolymer.

A polyarylene sulfide copolymer can include a segment derived from a polyarylene sulfide structure of the formula (VII):

(VII)

where Ar is an aromatic radical, or more than one condensed aromatic radical, and q is a number from 2 to 100, in particular from 5 to 20. The radical Ar in formula (VII) may be a phenylene or naphthylene radical. In one embodiment, the second segment may be derived from poly(m-thiophenylene), from poly(o-thiophenylene), or from poly(p-thiophenylene).

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be formed that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups.

By way of example, monomer components used in forming a semi-linear polyarylene sulfide can include an amount of polyhaloaromatic monomers having 2 or more halogen substituents per molecule which can be utilized in preparing branched polymers. Such monomers can be represented by the formula R'$X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic monomers having more than two halogens substituted per molecule that can be employed in forming a semi-linear starting polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

In the illustrated embodiment, the dihaloaromatic monomer can include p-dichlorobenzene (pDCB), as shown. In general, the amount of the dihaloaromatic monomer(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

The dihaloaromatic monomer can be charged into the second reactor with a relatively low molar ratio of the dihaloaromatic monomer to the alkali metal hydrogen sulfide of the complex. For instance, the ratio can be from about 1 to about 1.035, or about 1 in one embodiment. The relatively low ratio of the dihaloaromatic monomer to the alkali metal hydrogen sulfide of the complex can be favorable for the formation of the final high molecular weight polymer via the condensation polymerization reaction.

The ratio of solvent to sulfur in the second stage can also be relatively low. For instance, the ratio of the alkali metal hydrogen sulfide of the complex to the organic amide solvent in the second stage (including the solvent added to the second reactor and solvent remaining in the complex solution from the first reactor) can be from about 2 to about 2.5. This relatively low ratio can increase the concentration of reactants in the second reactor, which can increase the relative polymerization rate and the per volume polymer production rate.

The second stage reaction can be carried out under an inert atmosphere, such as nitrogen, and at increased pressure. For instance, the pressure in the second reactor 102 during the second stage can be from about 120 kPa to about to about 1500 kPa, from about 150 kPa to about 1000 kPa, from about 200 kPa to about 800 kPa, or from about 400 kPa to about 600 kPa.

The second reactor 102 can include a vapor outlet for removal of vapor during the second stage in order to maintain the desired pressure level. For instance, the second reactor can include a pressure relief valve as is known in the art. Vapor removed from the second stage can be condensed and separated as at separator 108, for instance to recover unreacted monomer for return to the reactor 102. A portion of the water of the vapor can be removed to maintain the near-anhydrous conditions of the second stage, and a portion of the water can be returned to the second reactor. A small amount of water in the second reactor can generate reflux in the top of the reactor 102, which can improve separation between the water phase and the organic solvent phase in the reactor. This can in turn minimize loss of the organic solvent in the vapor phase removed from the reactor 102 as well as minimize loss of hydrogen sulfide in the vapor stream due to absorption of the hydrogen sulfide by the highly alkaline organic solvent as discussed previously.

The second stage polymerization reaction can generally be carried out at a temperature of from about 120° C. to about 280° C., or from about 200° C. to about 260° C. The duration of the second stage can be, e.g., from about 0.5 to about 15 hours, or from about 1 to about 5 hours.

The termination of the second stage polymerization reaction is generally that point at which the conversion rate of the dihaloaromatic monomer in the second reactor 102 reaches not less than about 50 mol %, not less than about 70 mol %, or not less than about 90 mol % of the theoretical conversion. The theoretical conversion of the dihaloaromatic monomer can be calculated from one of the following formulas:

(a) In the case wherein the dihaloaromatic monomer has been added in excess (by molar ratio) of the alkali metal sulfide:

$$\text{Conversion rate} = \frac{X-Y}{X-Z} \times 100$$

(b) In the cases other than (a):

$$\text{Conversion rate} = \frac{X-Y}{X} \times 100$$

wherein X is the amount of the charged dihaloaromatic monomer; Y is the remaining amount of the dihaloaromatic monomer and Z is the excessive amount of dihaloaromatic monomer in moles.

(c) In the case other than (a) or (b)

Conversion rate=$A/B*100$

Wherein A is the total weight of salt collected after removal of the residual polymer and other species other than salt by-product; B is the theoretical weight of salt which is two times the molar amount of the effective sulfide present during the polymerization.

Following the second stage polymerization reaction, the mean molar mass of the prepolymer as expressed by the weight average molecular weight, $M_w$, can be from about 500 g/mol to about 30,000 g/mol, from about 1000 g/mol to about 20,000 g/mol, or from about 2000 g/mol to about 15,000 g/mol.

The polymerization reaction apparatus for use in the second stage is not especially limited, although it is typically desired to employ an apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The second reactor 102 can be stainless steel, though improved corrosion can be obtained by use of other materials such as a nickel-based alloy or titanium.

Following the second stage polymerization reaction, the product solution that exits second stage reactor 102 can include the prepolymer, the solvent, and one or more salts that are formed as a by-product of the polymerization reaction. For example, the proportion by volume of the prepolymer solution exiting the second stage reactor 102 of salt that is formed as a byproduct to the reaction can be from about 0.05 to about 0.25, or from about 0.1 to about 0.2.

Salts included in the reaction mixture can include those formed as a byproduct during the reaction as well as other salts added to the reaction mixture, for instance as a reaction promoter. The salts can be organic or inorganic, i.e. can consist of any combination of organic or inorganic cations with organic or inorganic anions. They can be at least partially insoluble in the reaction medium and have a density different from that of the liquid reaction mixture.

According to one embodiment, at least a portion of the salts in the prepolymer mixture that exits the second stage reactor 102 can be removed from the mixture at a separation unit 105 prior to the third stage polymerization in third stage reactor 104. Removal of salts prior to final polymerization can simplify final polymer separation processes as well as increase the reaction rate of the third stage polymerization as a lower sulfur to solvent ratio may be used in the third stage, effectively increasing the polymer concentration and formation rate. In addition, by carrying out a salt separation process prior to the third stage polymerization reaction, the capacity of the third reactor for the reactants can be increased.

The separation method utilized at separation unit 105 to remove salts from the prepolymer solution is not particularly limited. For instance, the salts can be removed by use of screens or sieves as has been utilized in traditional separation processes. A salt/liquid extraction process can alternatively or additionally be utilized in separating the salt from the prepolymer solution. In one embodiment, a hot filtration process can be utilized in which the solution can be filtered at a temperature at which the prepolymer is in solution and the salts are in the solid phase.

According to one embodiment, a salt separation process can remove about 95% or more of the salts including in the prepolymer solution that exits the second reactor 102. For instance greater than about 99% of the salts can be removed from the prepolymer solution.

Following the prepolymer polymerization reaction in the second stage of the process and the filtration process, a third stage of the formation can take place during which the molecular weight of the prepolymer is increased in a third reactor 104. Input to the third reactor 104 can include the prepolymer solution from the second reactor 102 in addition to solvent, one or more dihaloaromatic monomers, and a sulfur-containing monomer. In the illustrated embodiment, the sulfur-containing monomer is sodium sulfide, but this is not a requirement of the third stage, and other sulfur containing monomers, such as an alkali metal hydrogen sulfide monomer may alternatively be utilized.

The dihaloaromatic monomers added to the third stage can be the same or different as the dihaloaromatic monomers added in the second stage. For example, it is possible to include a monohalo monomer (not necessarily an aromatic compound) in one or both of the second or the third stage in order to form end groups of the polyarylene sulfide or to regulate the polymerization reaction and/or the molecular weight of the polyarylene sulfide.

In one embodiment, the third reaction conditions can be nearly anhydrous, with the ratio of water to the sulfur-containing monomer less than about 0.2, for instance between 0 and about 0.2. The low water content during the third stage of the process can increase the polymerization rate and the polymer yield as well as reduce formation of undesired side reaction by-products as the conditions are favorable for nucleophilic aromatic substitution. Moreover, as pressure increases in the third stage are generally due to water vaporization, low water content during this stage can allow the third reaction to be carried out at a constant, relatively low pressure, for instance less than about 1500 kPa. As such, the third reactor 104 need not be a high pressure reactor.

Near-anhydrous conditions in this stage are not a requirement, however, and in one embodiment, higher water content can be utilized in the third stage. For example, the ratio of water to the sulfur-containing monomer in the third reactor 104 can be greater than about 0.2, greater than about 1, or greater than about 2. For instance, the ratio of water to the sulfur-containing monomer in the third reactor can be from about 2 to about 4, or from about 2.5 to about 3, in one embodiment.

The reaction conditions within the third reactor 104 can also include a relatively low molar ratio for the solvent to the sulfur-containing monomer. For instance, the ratio of solvent to sulfur-containing monomer can be from about 1 to about 5, from about 1.5 to about 4, or from about 2 to about 3, for instance about 2.5.

The third reactor 104 can include a vapor outlet for removal of vapor during the third stage in order to maintain the low pressure in the reactor. For instance, the third reactor can include a pressure relief valve as is known in the art. Vapor removed from the third stage can be condensed and separated as at separator 110 that can separate, e.g., hydrogen sulfide from water of the vapor. The removal of the water can also help to maintain the desired near-anhydrous conditions in the third reactor 104.

The reaction mixture of the third stage can be heated to a temperature of from about 120° C. to about 280° C., or from about 200° C. to about 260° C. and the polymerization can continue until the melt viscosity of the thus formed polymer is raised to the desired final level. The duration of the second polymerization step can be, e.g., from about 0.5 to about 20 hours, or from about 1 to about 10 hours. The weight average molecular weight of the formed polyarylene sulfide can vary as is known, but in one embodiment can be from about 1000 g/mol to about 500,000 g/mol, from about 2,000 g/mol to about 300,000 g/mol, or from about 3,000 g/mol to about 100,000 g/mol.

The polymerization reaction apparatus for use in the third stage is not especially limited, and can be the same or different as the reaction apparatus utilized in the second stage, e.g., a reaction apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The third reactor 104 can be stainless steel, though improved corrosion can be obtained by use of other materials such as a nickel-based alloy or titanium.

Following the third stage, the crystallization process can be carried out, as discussed, as well as any desired additional post-formation processing. Commonly, the polyarylene sulfide may be discharged following any desired post-processing through a perforated die to form strands that are taken up in a water bath, pelletized and dried. The polyarylene sulfide may also be in the form of a strand, granule, or powder.

Figure 2:
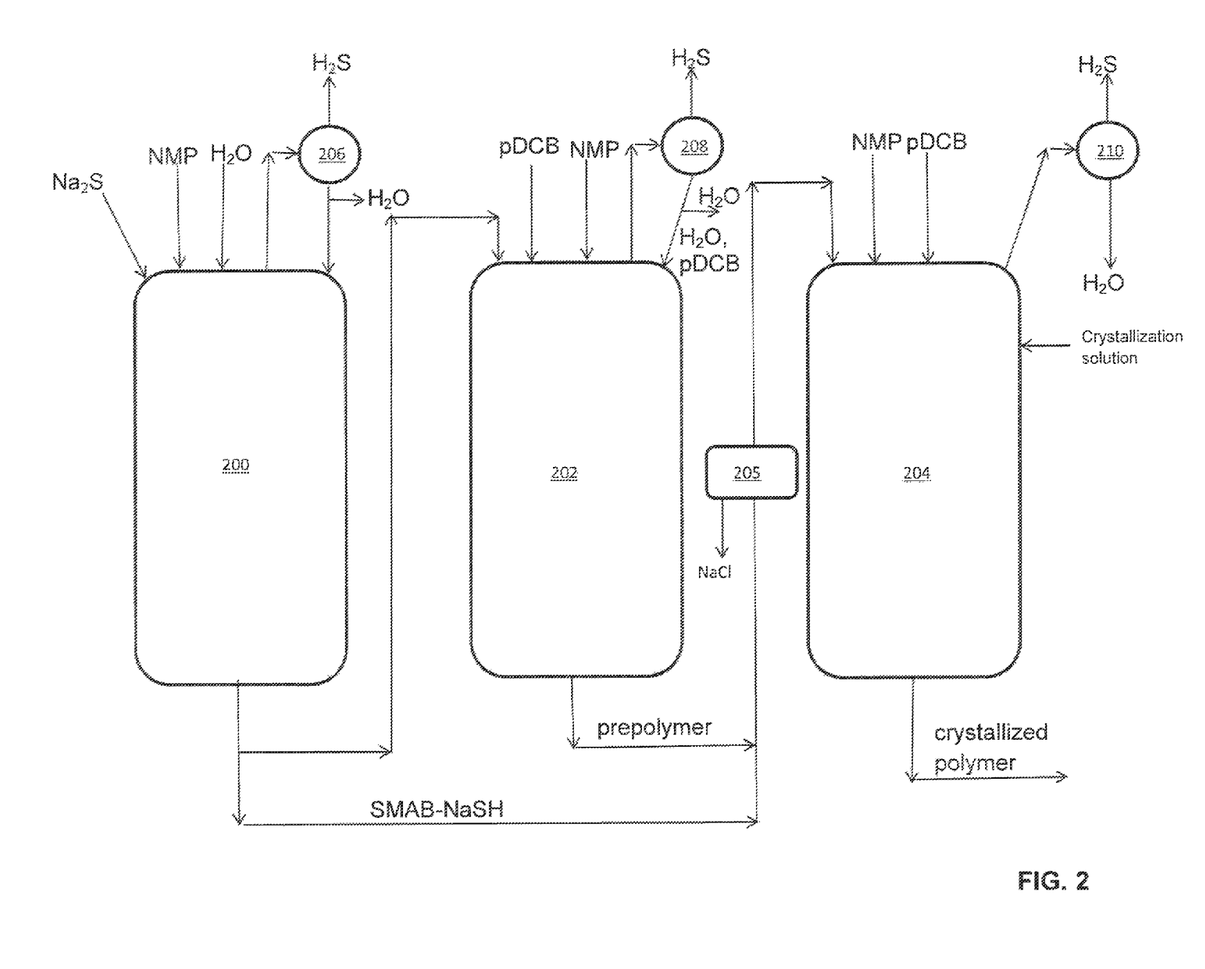
FIG. 2 is a flow diagram for another embodiment of a polyarylene sulfide formation process as described herein.

FIG. 2 illustrates another embodiment of the multi-stage polyarylene sulfide formation process. As can be seen, this process is similar to the multi-stage process of FIG. 1 and includes a first reactor 200, a second reactor 202 and a third reactor 204. In this system, however, the crystallization process does not take place in a separate crystallizer, but rather is carried out in the second reactor 204 following completion of the polymerization process in the second reactor 204. Accordingly, in this embodiment, following the predetermined duration of the second polymerization step to attain the desired molecular weight of the polyarylene sulfide, the pre-heated crystallization solution can be fed to the reactor 204 such that the polymer mixture thus formed is at a temperature of about 230° C. or greater, and the mixture can then be slowly cooled as described previously to form the crystallized polyarylene sulfide.

The feed to the first reactor 200 can include a sulfur-containing monomer, such as an alkali metal sulfide (e.g., $Na_2S$), an organic amide solvent (e.g., NMP), and water. The reactor 200 can include a vapor treatment stream including a condenser 206 similar to that of FIG. 1. The monomer complex formed in the first reactor 200 can be fed to the second reactor in conjunction with a dihaloaromatic monomer (pDCB) and solvent (NMP) to form a prepolymer. As shown, the second reactor can include a vapor treatment stream including a condenser 208 similar to that of FIG. 1. The prepolymer solution that exits the second reactor 202 can be subjected to salt separation as at separation unit 205 before entering the third reactor 204, as discussed above.

As illustrated in FIG. 2, according to this embodiment, the sulfur-containing monomer fed to the third reactor 204 can include the complex including the hydrolysis product of the solvent and a hydrogen sulfide monomer that was formed in the first stage of the process at the first reactor 200. Utilization of the complex formed in the first stage of the process in both the second and third polymerization stages of the process can improve overall efficiency of the process and decrease over costs of the process. The complex formed in the first stage can be fed to the third reactor 204 in conjunction with a dihaloaromatic monomer and additional solvent and the molecular weight of the prepolymer formed in the second stage can be increased as desired. As shown, the third reactor 204 can include a vapor treatment stream including a condenser 210 and water can be removed from the third reactor in order to maintain desired near-anhydrous conditions and low pressure during the third stage.

Following the third stage polymerization reaction and crystallization, post treatment as is generally known in the art can be carried out to purify or otherwise improve the characteristics of the polyarylene sulfide formed by the process. For example, a second filtration process can be carried out that can remove any additional salt from the product mixture, for instance any salt formed as the molecular weight of the prepolymer is increased during the third stage polymerization.

Following formation, the crystallized polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. The polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel. By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

A polyarylene sulfide formed according to the multi-stage process can exhibit beneficial characteristics. For instance, the melt viscosity of the neat polymer (i.e., no additives) as determined according to ISO Test No. 11443 at 310° C. and 1,200/seconds can be from about 200 Poise to about 700 Poise, or from about 220 Poise to about 650 Poise, in one embodiment. The bulk density of the polymer can generally be between about 0.2 grams per cubic centimeter and about 1.5 grams per cubic centimeter, for instance between about 0.3 grams per cubic centimeter and about 1 gram per cubic centimeter as determined according to ISO Test No. 1183 (technically equivalent to ASTM D792). The volatile content of the polymer can be about 0.5 wt. % or less, for instance about 0.2 wt. % or less, based upon weight loss following vacuum drying.

The crystallization temperature, $T_{c2}$ can be between about 190° C. and about 300° C., for example between about 200° C. and about 265° C., as determined by differential scanning calorimetry, for instance as described in ISO Standard 10350. The pH of the formed polymer can generally be between about 3 and about 12. The polyarylene sulfide can also have a good appearance. For instance, the polyarylene sulfide can have a yellowness index of less than about 18.5 as determined according to ASTM e313.

The process can form a polyarylene sulfide with a good particle size distribution. For instance, the $d_{10}$ value can be from about 15 micrometers to about 30 micrometers, the $d_{50}$ value can be from about 70 micrometers to about 100 micrometers, and the $d_{90}$ value can be from about 100 micrometers to about 150 micrometers. The median diameter of the particles can be from about 100 micrometers to about 1000 micrometers. In one embodiment, about 95% or more of the particles can be between about 50 micrometers and about 150 micrometers in particle size. For instance, about 0.5 wt. % or less of the particles can have a diameter of greater than about 2800 micrometers, and about 10 wt. % or less of the polymers can have a diameter of less than about 110 micrometers.

The polyarylene sulfide can be utilized in forming products as are generally known in the art. For instance, the polyarylene sulfide can be combined with additives such as one or more of fillers (e.g., fibers and/or particulate fillers), coupling agents, an impact modifier, antimicrobials, pigments, lubricants, antioxidants, stabilizers, surfactants, waxes, flow promoters, solid solvents, and other materials added to enhance properties and processability. Such optional materials may be employed in mixture in conventional amounts.

A mixture that is melt processed to form a melt processed polyarylene sulfide composition may include the crystallized polyarylene sulfide (or a blend of multiple polyarylene sulfides, at least one of which is the crystallized polyarylene sulfide formed as described herein) in an amount from about 40 wt. % to about 90 wt. % by weight of the mixture, for instance from about 45% wt. % to about 80 wt. % by weight of the mixture.

The crystallized polyarylene sulfide may be melt processed according to techniques known in the art. For example, the polyarylene sulfide may be melt-kneaded in conjunction with one or more additives in a single-screw or multi-screw extruder at a temperature of from about 250° C. to about 320° C. In one embodiment, the polyarylene sulfide may be melt processed in an extruder that includes multiple temperature zones. For instance, the polyarylene sulfide may be melt processed in an extruder that includes a temperature zone that is maintained at a temperature of between about 250° C. and about 320° C.

Conventional shaping processes for forming articles including the polyarylene sulfide may be used. For instance, extrusion, injection molding, blow-molding, thermoforming, foaming, compression molding, hot-stamping, fiber spinning and so forth can be used.

Shaped articles that may be formed including the polyarylene sulfide may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

A composition including the crystallized polyarylene sulfide can be used in a variety of electrical and electronic applications such as, for example, connectors and over-molding (insert-molding) parts is encompassed.

While certain representative embodiments and details have been shown for the purpose of illustrating the subject invention, it will be apparent to those skilled in this art that various changes and modifications may be made therein without departing from the scope of the subject invention.

What is claimed is:

1. A method for forming a polyarylene sulfide comprising:
   polymerizing a first sulfur-containing monomer and a first dihaloaromatic monomer in an organic amide solvent to form a polyarylene sulfide prepolymer;
   polymerizing the polyarylene sulfide prepolymer with a second dihaloaromatic monomer and a second sulfur-containing monomer in the presence of a crystallization solution to form a polyarylene sulfide, wherein the crystallization solution contains water and is supplied at a temperature of from about 50° C. to 200° C.

2. The method of claim 1, wherein the crystallization solution contains only water.

3. The method of claim 1, wherein the crystallization solution also includes an acid.

4. The method of claim 1, wherein the method comprises formation of a hydrogen sulfide by-product, the molar amount of acid in the crystallization solution being equivalent to the molar amount of the hydrogen sulfide by-product.

5. The method of claim 1, wherein the crystallization solution also comprises an organic amide solvent.

6. The method of claim 1, wherein the first sulfur-containing monomer is a complex of sodium methylaminobutyrate and sodium hydrogen sulfide.

7. The method of claim 6, wherein the second sulfur-containing monomer is a complex of sodium methylaminobutyrate and sodium hydrogen sulfide.

8. The method of claim 1, wherein the organic amide solvent is N-methyl-2-pyrrolidone.

9. The method of claim 1, wherein the first sulfur-containing monomer is sodium hydrogen sulfide or sodium sulfide.

10. The method of claim 1, wherein the dihaloaromatic monomer includes a mixture of different dihaloaromatic monomers.

11. The method of claim 1, wherein the dihaloaromatic monomer comprises dichlorobenzene.

12. The method of claim 1, wherein the prepolymer has a weight average molecular weight of from about 500 grams per mole to about 30,000 grams per mole.

13. The method of claim 1, wherein the polymerization that forms the polyarylene sulfide prepolymer also forms a salt, the method further comprising separating the salt from the prepolymer.

14. The method of claim 1, wherein the second dihaloaromatic monomer is the same as the first dihaloaromatic monomer.

15. The method of claim 1, wherein the second dihaloaromatic monomer is different than the first dihaloaromatic monomer.

16. The method of claim 1, wherein the second sulfur-containing monomer is the same as the first sulfur-containing monomer.

17. The method of claim 1, wherein the second sulfur-containing monomer is different than the first sulfur-containing monomer.

18. The method of claim 1, wherein the polyarylene sulfide prepolymer is polymerized with the second dihaloaromatic monomer and the second sulfur-containing monomer in near-anhydrous conditions.

19. The method of claim 1, further comprising purifying the polyarylene sulfide.

20. The method of claim 1, further comprising combining the polyarylene sulfide with one or more additives.

21. A molded product comprising the polyarylene sulfide of claim 1.

22. The method of claim 1, wherein the crystallization solution is present in an amount of about 5 wt. % or more based on the weight of a mixture containing the crystallization solution, the prepolymer, and the second sulfur-containing monomer.

23. The method of claim 22, wherein the crystallization solution is present in an amount of from about 3 wt. % to about 10 wt. % by weight of the mixture.

24. The method of claim 1, wherein the prepolymer is heated to a temperature of about 230° C. or greater during the polymerizing.

25. The method of claim 1, further comprising cooling the polyarylene sulfide to a temperature of about 190° C. or less.

26. The method of claim 25, wherein the cooling occurs at a rate of about 0.5° C. per minute or less.

27. The method of claim 1, wherein the crystallization solution is supplied at a temperature of from about 80° C. to about 150° C.

* * * * *